Feb. 14, 1961 P. L. FOX 2,971,438
OFF-MOUNT MAGAZINE AMMUNITION TRANSFER MECHANISM
Filed May 11, 1951 8 Sheets-Sheet 1

FIG. 1

INVENTOR.
PAUL L. FOX
BY
ATTORNEYS

Feb. 14, 1961 P. L. FOX 2,971,438
OFF-MOUNT MAGAZINE AMMUNITION TRANSFER MECHANISM
Filed May 11, 1951 8 Sheets-Sheet 2

FIG. 2

INVENTOR
PAUL L. FOX
BY
ATTORNEYS

Feb. 14, 1961 P. L. FOX 2,971,438
OFF-MOUNT MAGAZINE AMMUNITION TRANSFER MECHANISM
Filed May 11, 1951 8 Sheets-Sheet 4

INVENTOR
PAUL L. FOX
BY
ATTORNEYS

Feb. 14, 1961 P. L. FOX 2,971,438
OFF-MOUNT MAGAZINE AMMUNITION TRANSFER MECHANISM
Filed May 11, 1951 8 Sheets-Sheet 5

INVENTOR
PAUL L. FOX
ATTORNEYS

Feb. 14, 1961 P. L. FOX 2,971,438
OFF-MOUNT MAGAZINE AMMUNITION TRANSFER MECHANISM
Filed May 11, 1951 8 Sheets-Sheet 7

INVENTOR
PAUL L. FOX

BY
J. D. O'Brien
Q. Baxter Warren
ATTORNEYS

United States Patent Office 2,971,438
Patented Feb. 14, 1961

2,971,438

OFF-MOUNT MAGAZINE AMMUNITION TRANSFER MECHANISM

Paul L. Fox, Upper Providence Township, Pa., assignor, by mesne assignments, to the United States of America as represented by the Secretary of the Navy Filed May 11, 1951, Ser. No. 225,735

24 Claims. (Cl. 89—45)

The invention relates to improvements in article handling machinery and more particularly to equipment for automatically supplying ammunition to a rotary gun mount.

Large caliber automatic guns employing fixed ammunition have heretofore been limited in their firing capacity or firing rate by their on-mount ammunition storage capacity or by the speed with which human loaders at a transfer station can move ammunition from a magazine to the relatively rotatable gun mount. If the mount is made larger so more ammunition may be stored therein, its own increase in inertia and the increase in inertia of the ammunition imposes greater loads and reduces the speed and precision of the training mechanism.

An important object of the present invention is to provide an automatic gun mount with improved off-mount ammunition transfer mechanism whereby a high rate of fire can be maintained.

Another important object of the invention is the provision of an automatic gun mount with improved equipment automatically transferring projectiles from a magazine to a rotary gun mount during training movement thereof.

Another object of the invention is to provide an automatic gun mount with ammunition feed mechanism arranged to minimize inertia of the mount.

A further object is to provide automatic transfer mechanism for supplying projectiles to a rotary gun mount without impact during transfer.

A still further object is the provision of transfer equipment selectively supplying projectiles of different types to a rotary gun mount without interruption in the continuity of supply during changeover from one type of projectile to another.

Another important object is the provision of an automatic gun mount with means keeping successive operations of an off-mount ammunition transfer mechanism approximately in step with successive projectile pickups by an on-mount projectile hoist.

A further object is to provide means automatically discontinuing operation of the hoist drive mechanism should operation of the transfer mechanism lag more than a predetermined number of steps.

A still further object is the provision of means automatically discontinuing operation of the transfer mechanism should operation of the hoist lag more than a predetermined number of steps.

Other objects and advantages of the invention will be apparent during the course of the following detailed description, taken in connection with the accompanying drawings forming a part of this specification, and in which drawings.

Figure 1:
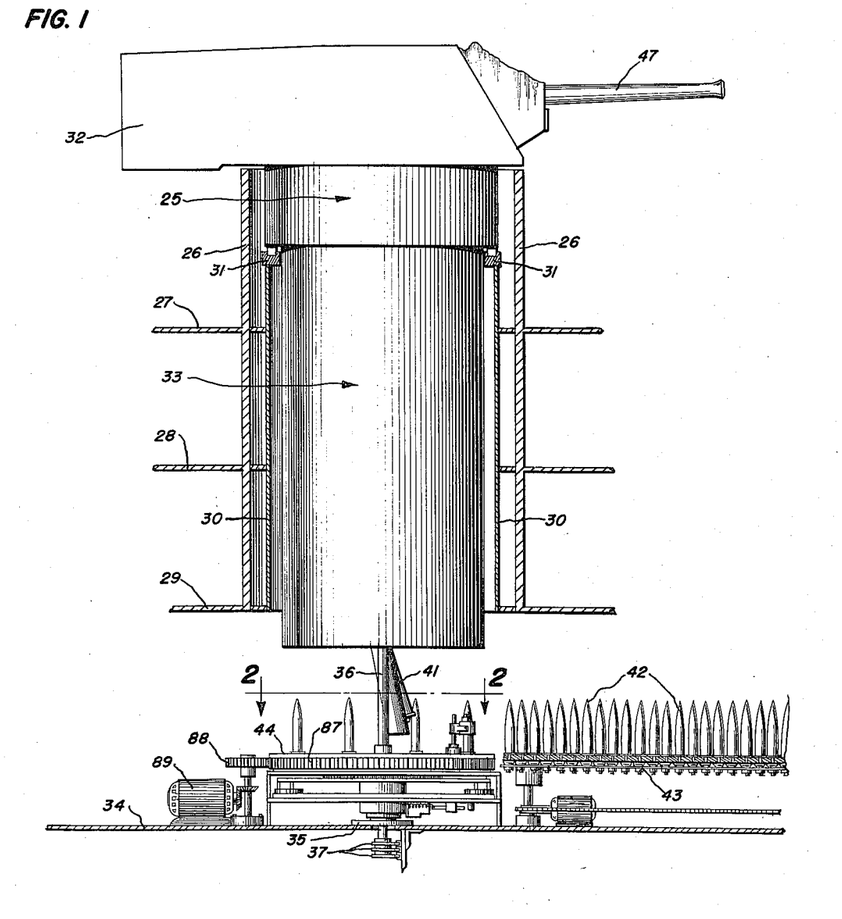
Fig. 1 is a view partly in elevation and partly in central vertical section of a rotary gun turret equipped with the improved automatic ammunition feed mechanism.
Figure 4:
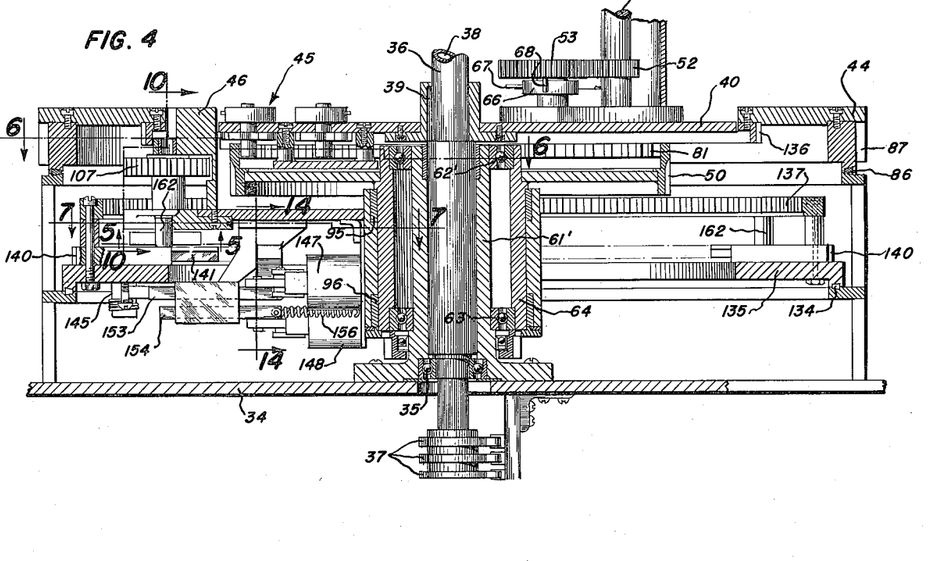
Fig. 4 is a central vertical sectional view of the ammunition feed mechanism substantially in the line 4—4 of Fig. 2.

In the drawings, which for the purpose of illustration show only a preferred embodiment of the invention, similar reference characters denote corresponding parts throughout the several views. Referring to Fig. 1 of the drawings, the numeral 25 generally designates a rotary gun turret provided with a conventional cylindrical barbette 26 extending between decks 27—29 of a ship. Extending coaxially upwardly within the barbette is a cylindrical stool 30 supporting an annular roller track 31 bearing an erect rotary gun house 32 and a depending turret trunk 33. Spaced below the turret trunk 33 is a foundation plate 34 provided with a bearing 35 rotatably supporting a hollow central column 36 coaxially of the turret trunk, as shown in Figs. 1 and 4. This column 36 is provided with slip rings 37 and an axial passageway 38 for leading electric conductors into rotary parts of the turret.

Fastened to the central column for rotation with the mount, as by a key 39 shown in Fig. 4, is an upper turntable or plate 40 supporting the lower end of suitable motor-driven projectile hoist mechanism 41 of the continuous type. From the foregoing it is evident that the rotary structure of the gun mount includes the gun house 32, depending trunk 35, column 36 and turntable 40.

Figure 2:
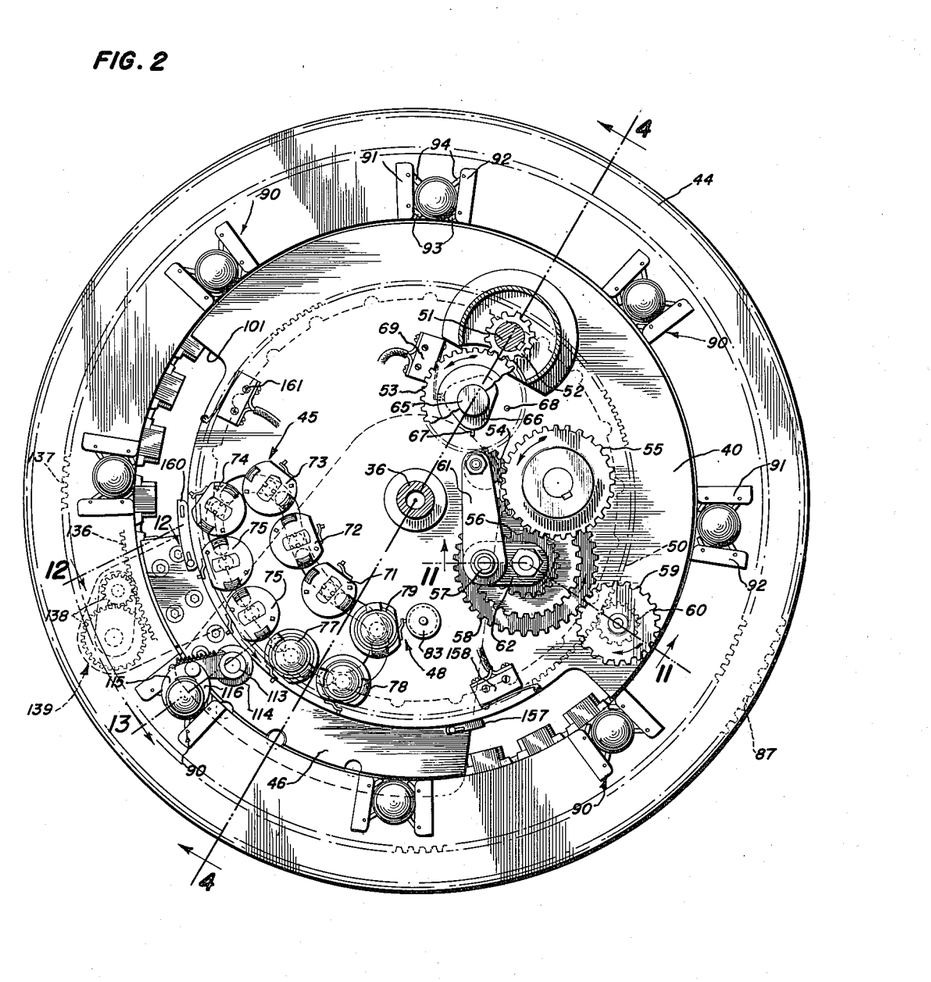
Fig. 2 is a horizontal sectional view substantially on the line 2—2 of Fig. 1 and showing the ammunition feed mechanism in plan.
Figure 3:
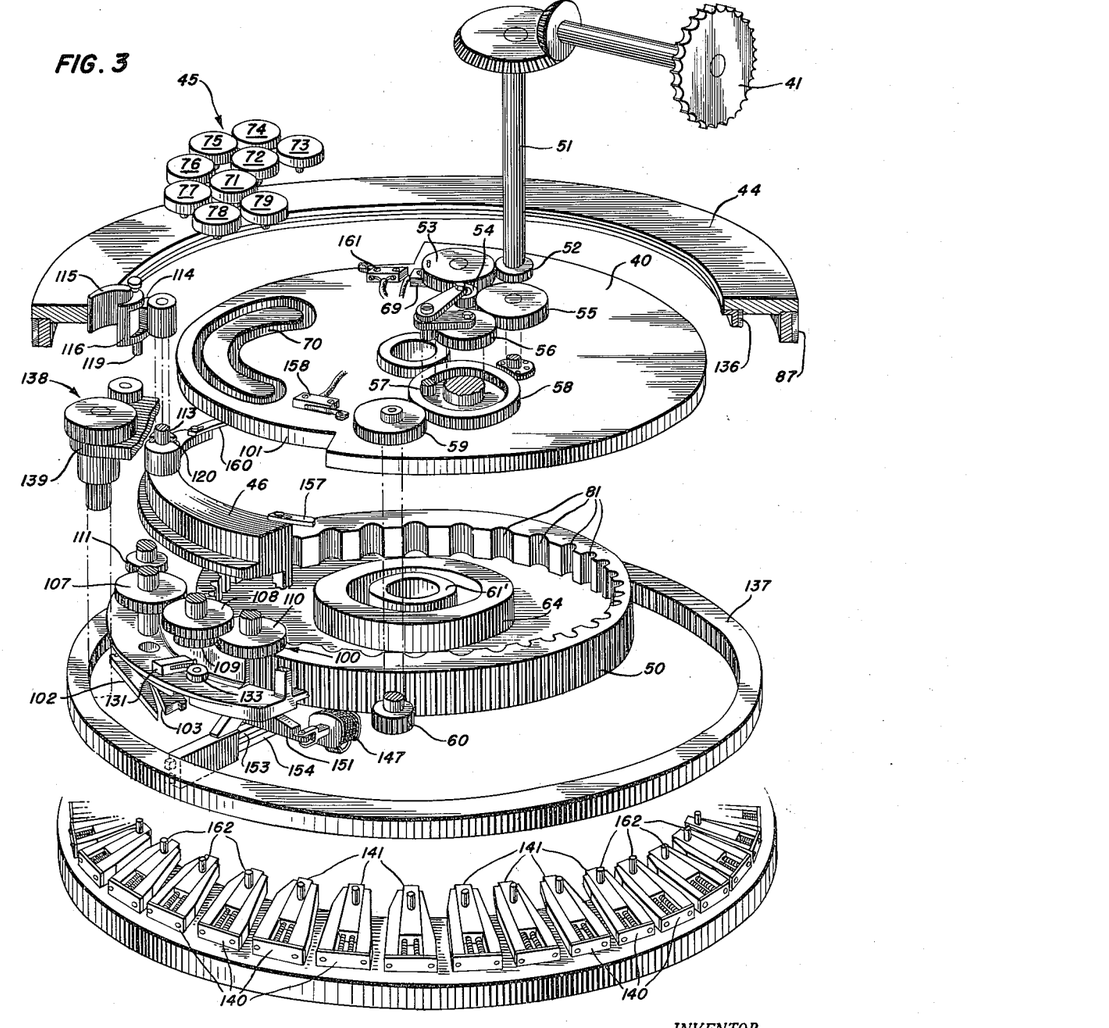
Fig. 3 is a vertically exploded fragmentary perspective view of the ammunition feed mechanism.

As shown in Fig. 1, vertically positioned projectiles 42 are supported by a motor-driven endless chain 43 of round carriers arranged along a path leading to the turret in such a manner as to utilize available storage space within the ship structure. These projectiles may be automatically transferred, as hereinafter explained, to an annular rotary magazine 44 encircling the upper turntable 40. Inside the rotary magazine 44 is a projectile accumulating conveyor 45 carried by the turntable 40, as shown in Figs. 2–4. Transfer of the rounds from the annular rotary magazine 44 to the accumulator conveyor is automatically accomplished by mechanism on a floating decelerator sector 46 constituting a projectile transfer carriage. The projectile transfer action depends on the rate of consumption of ammunition. The hoist-driven accumulator conveyor 45 can operate with the hoist 41 in reverse to store returning projectiles should operation of the hoist be temporarily reversed, as during elevation of the gun 47.

Figure 11:
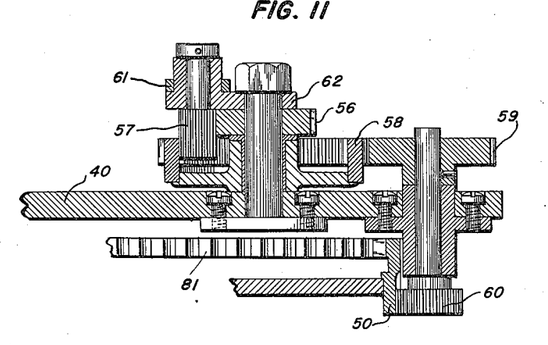
Figs. 11–13 are vertical sectional detail views substantially on the lines 11—11, 12—12 and 13—13 respectively of Fig. 2.
Figure 12:
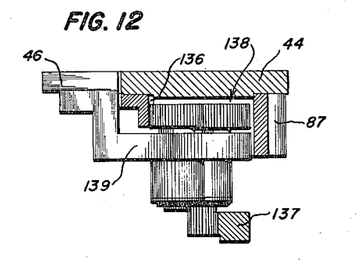
Figure 13:
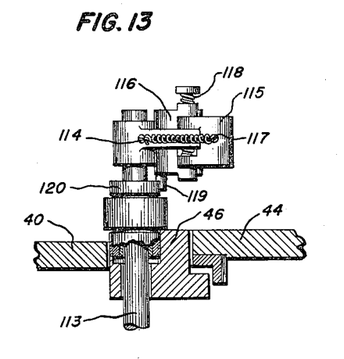
Figures 14, 15:
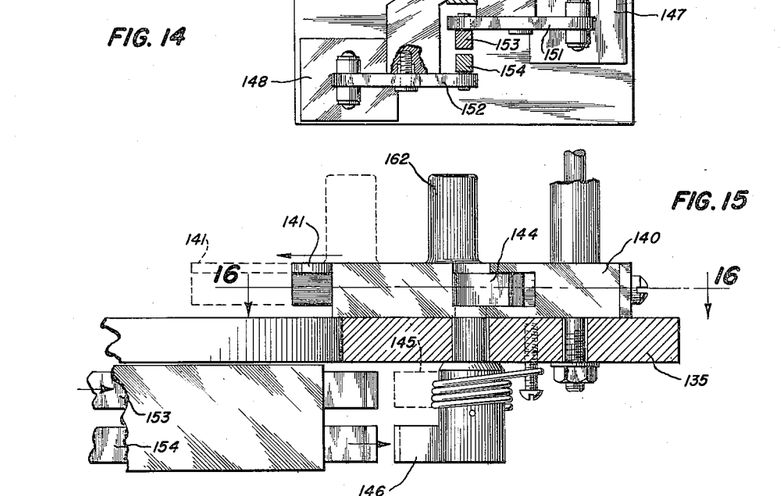
Fig. 14 is a vertical sectional detail view of an ammunition selector assemblage substantially on the line 14—14 of Fig. 4.
Fig. 15 is a fragmentary detail view of a Geneva drive cam and associated detent release mechanism partly in elevation and partly in vertical section substantially on the line 15—15 of Fig. 7.
Figure 16:
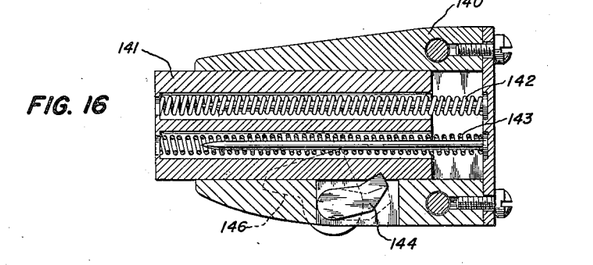
Fig. 16 is a horizontal sectional detail view of the cam detent mechanism substantially on the line 16—16 of Fig. 15.
Figure 17:
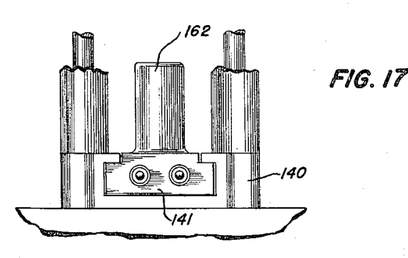
Fig. 17 is a fragmentary end elevational view of the Geneva drive cam and sliding carriage therefor.

The hoist picks up rounds of ammunition from a pickup station 48 on the upper turntable and conveys them to the gun 47. The hoist also drives a large sun gear 50 by the following mechanism: Operating in synchronism with the hoist mechanism is a shaft 51 driving a train of gears 52–60 mounted on the upper plate, as shown in Figs. 2, 3 and 11. Eccentrically pivoted at one end of the cycle gear 54 is a connecting link 61 having its opposite end pivoted to the outer end of a crank 62 pivoted for rotation about the axis of the sun gear 56. At its outer end the crank 62 rotatably supports the planetary gear 57 in mesh with the externally toothed sun gear 56 and the internally toothed ring gear 58. This ring gear 58 is also in external meshing engagement with the transfer gear 59 which drives pinion gear 60. Fixed on the foundation plate 34 is a hollow standard 61' coaxially supporting, as by spaced bearings 62', 63, the cylindrical hub 64 of the sun gear 50 meshing with the pinion gear 60. As link 61 reciprocates, an oscillatory motion is imparted to the crank 62 so that the planetary gear 57 is oscillated while driving the ring gear 58. The gear train 52–60 is thus arranged to impart intermittent counterclockwise rotation to the sun gear 50 upon constant counterclockwise rotation of the reducer gear 53 driven by the hoist shaft gear 52. Floating on the reducer gear shaft 65 is a trilobed cam 66 provided with a radially projecting pin 67 disposed in the circular path of travel of a downwardly depending pin 68 carried by the reducer gear. This arrangement provides a substantially 360° lost-motion connection between the reducer gear and the trilobed cam. Fixed on the upper turntable is a normally open hoist drive actuated signal switch 69 closed three times per revolution of the trilobed cam 66. For each revolution of the reducer gear 53, the gear train 52–60 is adapted to intermittently advance the gun gear 50 three steps in a counterclockwise direction. From the foregoing it is clear that the hoist drive actuated signal switch 69 is closed once for each counterclockwise step of the sun gear 50 following takeup of lost motion in the driving connection between the reducer gear and trilobed cam.

Figures 6, 8:
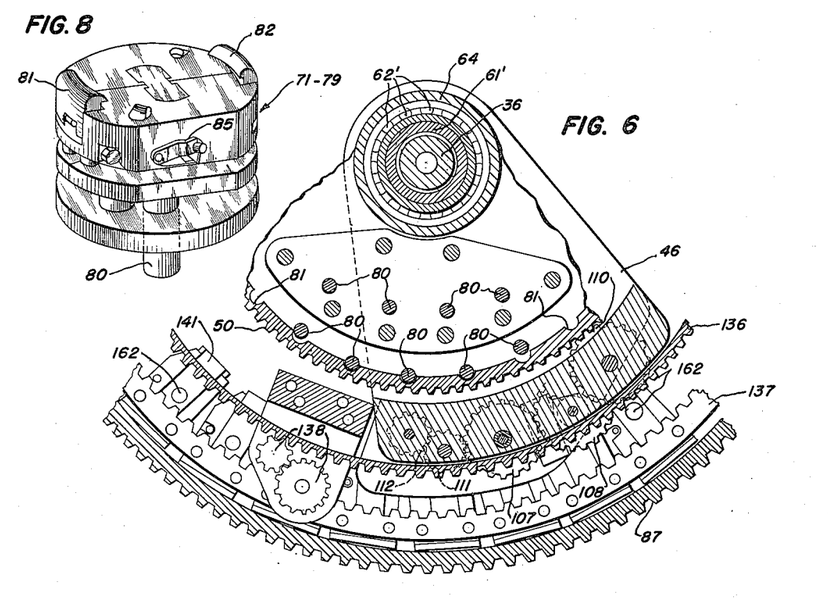
Figs. 6 and 7 are fragmentary horizontal sectional detail views substantially on the lines 6—6 and 7—7 respectively of Fig. 4.
Fig. 8 is a fragmentary perspective view of a conveyor round carrier preferably forming part of the equipment.
Figure 9:
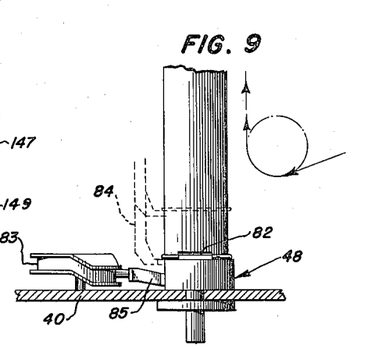
Fig. 9 is a fragmentary partly diagrammatic elevational view of apparatus for releasing and lifting a projectile from a round carrier at the ammunition hoist.

Supported on the upper turntable for movement along an endless slot 70 is the projectile accumulating conveyor 45 comprising a series of round carriers 71–79 provided with depending axial drive pins 80 adapted for engagement with the sun gear at semicylindrical indentations 81 circumferentially thereof. Referring to Fig. 8, each round carrier is equipped with spaced releasable rim clamps 81, 82 adapted to hold a projectile upright by engagement with its flanged base. As the ring gear 50 is moved intermittently, the accumulating conveyor 45 is likewise advanced intermittently. Thus a round of ammunition will dwell at the pickup station 48 while the hoist engages therewith, in the manner shown diagrammatically in Fig. 9. Operating in synchronism with the hoist mechanism is a rotary cam 83 and an elevating foot 84. When the round carrier arrives at the hoist pickup station, the rotary cam actuates an unlocking lever 85 on the round carrier to release the rim clamps; and the elevating foot lifts the projectile into the continuous hoist mechanism.

Mounted as by bearings 86 for clockwise rotation coaxially of the turret is the annular magazine 44 driven at a constant speed as by gearing 87—88 and a motor 89. This magazine ring carries the rounds of ammunition that are to be transferred to the inner platform. Mounted on the magazine ring is an annular series of equiangularly spaced projective holders 90 each comprising spaced projectile guiding standards 91, 92 equipped with spring biased retaining latches 93 and pawls 94 adapted to normally maintain a projectile upright and in radial alignment between the standards.

Figure 5:
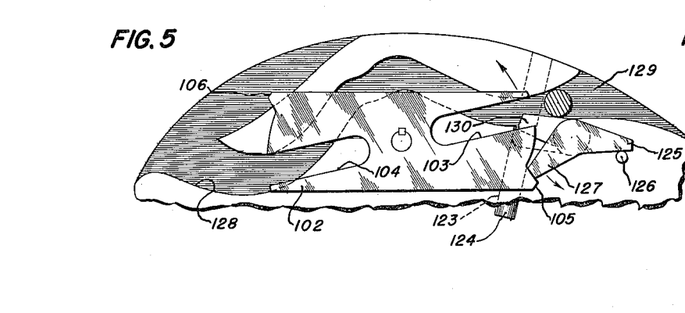
Figs. 5 and 5a are fragmentary detail views partly in inverted plan and partly in inverted horizontal section on the line 5—5 of Fig. 4 and illustrating Geneva drive mechanism in its latched and released positions respectively.
Figure 5A:
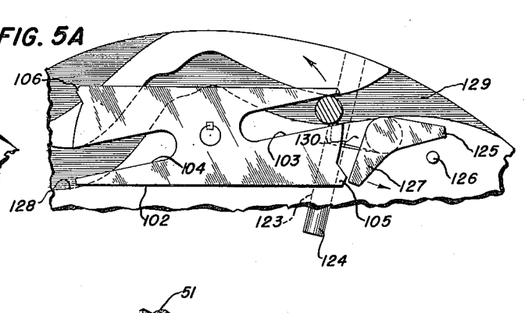
Figure 7:
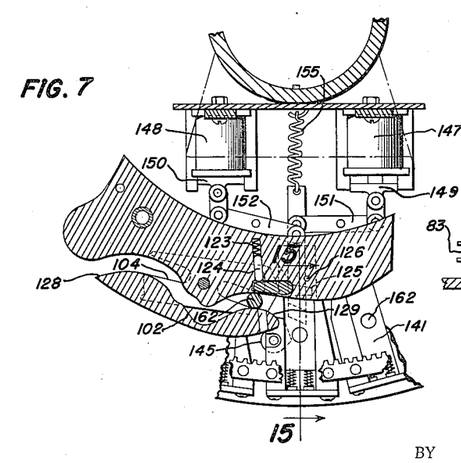
Figure 10:
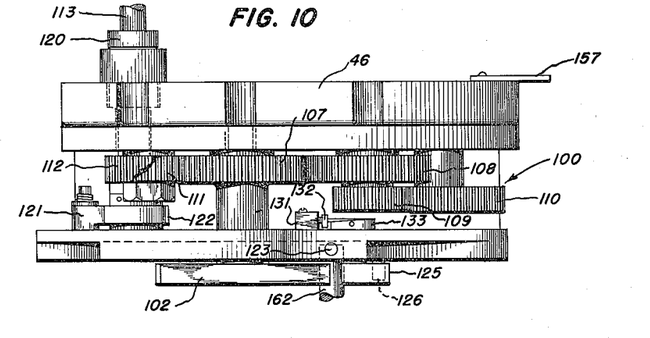
Fig. 10 is a view of a floating sector in end elevation substantially on the line 10—10 of Fig. 4.

Pivotally mounted on the hub for oscillation about the turret axis as by bearings 95, 96 is the floating decelerator sector or transfer carriage 46 carrying planetary transfer mechanism 100 along an arcuate circumferential slot 101 in the margin of the upper plate. Rotatably supported by the floating decelerator sector is a Geneva wheel 102 provided with diametrically opposite cam slots 103, 104 and with peripheral projections 105, 106 as shown more particularly in Figs. 5 and 5a. Fastened for rotation with the Geneva wheel is a coaxial drive gear 107 transmitting rotary motion through reduction gears 108, 109 to a planetary gear 110 meshing with the sun gear 50. The arrangement of gearing is such that for each clockwise half turn of the Geneva wheel the floating sector is bodily displaced in a clockwise direction an angular distance equal to the angular spacing between adjacent round carriers along the outer margin of the accumulator conveyor. Through an idler gear 111 the drive gear 107 also transmits rotary motion of the Geneva wheel to a transfer gear 112 whose shaft 113 imparts one clockwise revolution to a transfer arm 114 for each clockwise half turn of the Geneva wheel. Pivoted on the transfer arm are jaws 115, 116, normally held open as by springs 117, 118. While turning, the transfer arm is adapted to tangentially intercept, without impact, a projectile traveling at constant speed on the annular plate 44; to thereupon grip the projectile while swinging in into tangential alignment with the arcuate path of travel of the round conveyor 45; and to release the projectile while it is disposed on a round carrier of the conveyor 45. To this end the jaws 115, 116, throughout the gripping portion of each revolution of the transfer arm, are held closed by camming engagement. This camming occurs between a depending lug 119 on the moving jaw 116 and a stationary segmental cam 120 suitably affixed to the floating sector. Counterclockwise rotation of the transfer arm is limited by a pawl 121 engaging a ratchet 122 on the transfer gear shaft, as shown in Fig. 10. Formed in the floating sector, as illustrated in Fig. 7, is a bore 123 receiving a reciprocable spring-pressed plunger 124 urging one arm 125 of a rotary detent to turn in a counterclockwise direction toward a normal position of engagement with a stop pin 126. As viewed upside down in Figs. 5 and 5a, the arm 125 is of course urged in a clockwise direction. Another arm 127 of this rotary detent normally engages one of the peripheral projections 105, 106 of the Geneva wheel to prevent clockwise rotation thereof beyond a predetermined angular position wherein the Geneva wheel normally dwells. Inasmuch as the Geneva wheel is normally held by the detent arm 127 against clockwise rotation, the planet gear 107 will not be turned upon counterclockwise rotation of the sun gear 50. The planet gear is rotated only when the Geneva wheel is released and driven. When the hoist is not operating, the sun gear 50 moves with the mount during training thereof. Formed in the lower side of the floating sector is a cam groove 128 having an entrance end 129 extending over one of the Geneva wheel cam slots 103, 104 whenever the Geneva wheel dwells in said angular position. Integral with the rotary detent is a release arm 130 laterally extending into the cam groove during engagement of the detent with the Geneva wheel. Fixed on the floating sector is a response switch 131 normally held closed by a projecting finger 132 affixed to a collar 133 fast on the rotary detent shaft. The arrangement is such that the switch 131 is opened momentarily at the beginning of each half turn of the Geneva wheel upon actuation of the Geneva wheel detent release arm 130.

Mounted as by a bearing 134 such as shown in Fig. 4 for rotation below the rotary magazine 44 is an annular cam plate 135 driven by ring gears 136, 137 on the upper and lower plates meshing with quarter-speed reduction gearing 138 carried by a bracket 139 on the floating sector. Mounted for radial movement in guides 140 on the annular cam plate are slides 141 normally held against the resistance of compression coil springs 142, 143 in radially outwardly displaced positions as by alternate and intervening detents 144. These alternate and intervening detents are releasable by latches 145, 146 respectively disposed at upper and lower levels.

Affixed to the floating sector are upper and lower selectively energizable solenoids 147, 148 equipped with armatures 149, 150 acting through pivoted linkage 151, 152 to radially outwardly project a selected one of two plungers 153, 154 into detent latch tripping position against the resistance of contractile coil springs 155, 156. The plungers operate at different levels to trip the upper and lower latches respectively. By providing dual sets of latches and tripping plungers at different levels the ammunition being fired may be changed, for instance from antiaircraft to armor piercing type, without interrupting the continuity of supply to the hoist.

Figure 18:
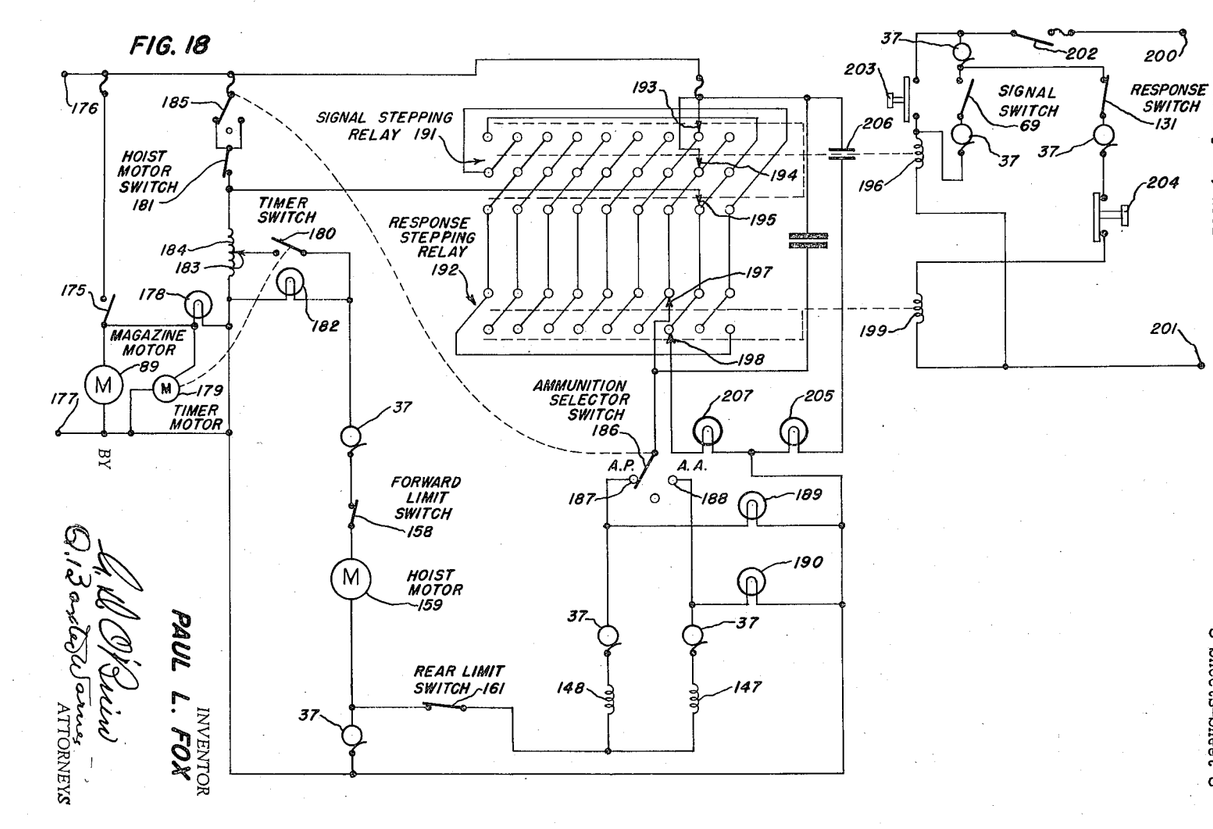
Fig. 18 is a diagrammatic view of an electrical control system for the ammunition feed mechanism.

Fixed on the upper turntable and opened upon relative counterclockwise rotation of the floating sector to a predetermined relative position, as by engagement of a lug 157 therewith is a normally closed forward limit switch 158 in series with the hoist motor 159 shown diagrammatically in Fig. 18. This limit switch acts to stop the hoist motor upon forward movement of the floating sector into a predetermined position. Fixed on the upper turntable and opened upon relative clockwise rotation of the floating sector, as by engagement of a lug 160 thereon, is a normally closed rear limit switch 161 in series with the solenoids. This rear limit switch acts to disable both solenoids so neither type of ammunition will be transferred to the turret.

Fixedly projecting upwardly from the slides are cylindrical cam pins 162 disposed in inactive locations by the slides in their normal outwardly displaced positions. By tripping an upper or lower latch 145 or 146, a detent 144 is released permitting inward displacement of its related spring-urged slide 141 whereby its associated cam pin 162 is shifted into its active position. As the actively disposed cam pin 162 is moved by clockwise rotation of the cam plate relative to the floating sector 46, it enters the leading end 129 of the cam slot 128 and is thus guided into one of the slots 103, 104 in the Geneva wheel. In brushing past the release arm 130, the Geneva wheel detent 127 is disengaged and response switch 131 is momentarily opened. By supplying predetermined alternate projectile holders 90 on the upper annular rotary magazine 44 with antiaircraft projectiles, the upper solenoid 147, for example, may be used for controlling the supply of antiaircraft projectiles to the gun. With this arrangement, as long as the upper solenoid 147 remains energized, successive upper latches 145 will be released as they pass the upper plunger 153 during clockwise rotation of the annular cam plate 135. Accordingly, only alternate cam pins will coact with the Geneva wheel; and the transfer mechanism will operate to shift only alternate rounds of antiaircraft ammunition from the rotary magazine to the turret.

Transfer of the rounds from the endless chain 43 to the annular rotary magazine 44 may be accomplished by a floating accelerator sector (not shown) carrying planetary transfer mechanism like that of the floating decelerator sector or transfer carriage 46 and adapted to compensate for phase and speed variation between the endless chain 43 and the rotary plate 44.

In Fig. 18 a magazine motor switch 175 is diagrammatically shown controlling energization of the rotary magazine motor 89 as by 115 volt 60 cycle current from supply lines 176, 177. Closing the magazine motor switch lights a magazine motor indicator lamp 178 and starts a timer motor 179 adapted, after a few seconds time delay, to close a normally open timer switch 180 in series with the hoist motor 159. This insures energization of the magazine motor circuit before the hoist motor is started. By closing a normally open hoist motor switch 181 in series with the timer switch 180, the hoist motor is started; and its operation is indicated by a hoist motor lamp 182. By adjustment of the variable pickoff arm 183 of an autotransformer 184, the speed of the hoist motor may be regulated. Connected in series with the hoist motor are the normally closed forward limit switch 158 and a triple throw auxiliary switch 185 open only in its center position.

Mechanically connected in gang relation to the auxiliary switch 185 is a triple throw ammunition selector switch 186 likewise open only in its center position. The left and right contacts 187, 188 thereof are respectively electrically connected to the lower and upper solenoids 148, 147 and to associated lamps 189, 190 adapted to indicate the selection of different kinds of ammunition, for example, of armor piercing and antiaircraft ammunition carried by the rotary magazine. The selector and rear limit switches 186, 161, and the solenoids 147, 148 in parallel, are serially connected to the current supply lines 176, 177 through signal and response stepping relays 191, 192. The signal stepping relay 191 is provided with three movable contacts 193, 194, 195 shown as arrow heads and adapted to simultaneously advance one step to the right along rows of stationary contacts as viewed in Fig. 18 upon energization and deenergization of its normally deenergized winding 196. Likewise the two movable contacts 197, 198 of the response stepping relay 192 are adapted to advance one step to the right along rows of stationary contacts upon deenergization of its normally energized winding 199. These windings 196, 199 of the signal and response stepping relays are respectively periodically energized and deenergized through the normally open hoist-driven signal switch 69 and the normally closed response switch 131 actuated by successive Geneva drive pins 162. These switches 69, 131 are connected to low voltage direct current supply lines 200, 201 during operation by closing a normally open manual switch 202. Connected respectively in parallel and in series with the signal and response switches 69, 131 are a normally open synchronizing signal button 203 and a normally closed synchronizing response button 204. Each time the synchronizing signal button 203 is pressed and released, the signal stepping relay is advanced one step, the action corresponding to that produced by closing and opening of the signal switch 69. Similarly, each time the synchronizing response button 204 is pushed, the response stepping relay is advanced one step. Each operation of the signal stepping relay 191 is indicated by a signal lamp 205 under the control of a normally open signal relay switch 206 closed upon energization of the winding 196. Another signal lamp 207 warns when the signal stepping relay is ahead of the response stepping relay.

If the signal and response stepping relays are in step, the signal lamp 207 is not lit; and the hoist motor 159 must be in operation in order to select ammunition, current then being supplied to the chosen ammunition selector solenoid winding 147 or 148 through the triple throw auxiliary switch 185, the hoist motor switch 181, contacts 195, 197 of the signal and response stepping relays, and the selector switch 186.

If the signal stepping relay 191 is one step ahead of the response stepping relay 192 as shown in Fig. 18, ammunition can be selected whether the hoist is on or off, current in this case being supplied to the chosen ammunition selector solenoid winding 147 or 148 through contacts 194, 197 of the signal and response stepping relays and the selector switch 186. If the signal stepping relay is one step ahead and the hoist is in operation, the signal lamp 207 is lit by current supplied through the triple throw auxiliary switch 185, the hoist motor switch 181, and contacts 195, 198 of the signal and response stepping relays.

If the signal stepping relay is two steps ahead of the response stepping relay, ammunition can be selected whether the hoist is on or off, current in this instance being supplied to the chosen ammunition selector solenoid winding 147 or 148 through relay contacts 193, 197 and the selector switch 186. The signal lamp 207 is lit whether the hoist is on or off by current supplied through relay contacts 194, 198. With the signal relay two steps ahead, ammunition can be selected for two rounds even though the hoist is not in operation, but when the relays fall into step, further selection cannot be made unless the hoist is in operation.

If the signal stepping relay is three steps ahead, the solenoids are switched off and no ammunition can be selected. The signal lamp 207 is lit by current supplied through relay contacts 193, 198.

If the signal stepping relay lags one step, the signal lamp is not lit; and the solenoids are switched off. Ammunition selection will now be delayed until the hoist operates to make room on the conveyor 45 for another round.

To more clearly illustrate the operation of the transfer mechanism, different conditions of operation will now be considered.

With the rotary annular magazine 44 loaded, the accumulator conveyor 45 empty, the hoist not operating, the mount not moving in train, and the signal stepping relay 191 two steps ahead of the response stepping relay 192, it is desired to transfer rounds of ammunition to the dormant conveyor 45. By closing switch 175 the magazine drive motor is started whereby the magazine 44 is rotated clockwise at constant speed. The selector switch 186 is moved to an ammunition selecting position whereby one of the solenoids 147, 148 is energized through relay contacts 193, 197 to project a selected one of the plungers 153, 154. As the lower cam carriage ring 135 is driven clockwise at a reduced speed through the differential gearing 138, alternate or intervening cam slides 141 are released in succession as long as the selected plunger remains extended. These released cam slides carry alternate pins 162 successively into the Geneva wheel cam groove 128 to intermittently drive the Geneva wheel 102 clockwise by successive half turns. For each half turn of this member, the following events occur: The transfer arm 114 rotates clockwise a full turn to transfer a round from the rotary magazine 44 to the dormant accumulator conveyor 45; the drive gear 107 is rotated clockwise to shift the decelerator sector or transfer carriage 46 to the left an angular distance corresponding to the spacing of adjacent conveyor round carriers 71–79; and the decelerator sector response switch 131 is momentarily opened. Inasmuch as the hoist motor is not operating, the hoist signal switch 69 is not actuated; the signal stepping relay 191 is dormant; and the response stepping relay 192 gains one step for each round transferred. When the decelerator sector or transfer carriage 46 has moved two steps to the left the response stepping relay 192 falls into step with the signal stepping relay 191 and the selector circuit, first closed through relay contacts 193, 197 and subsequently through relay contacts 194, 197, is thereupon disconnected. Thus, operation of the transfer mechanism is discontinued and the decelerator sector or transfer carriage 46 will remain in this last position until the hoist is operated. Should the decelerator sector or transfer carriage 46 reach its extreme left position in the marginal slot 101 of the upper platform 40 before the decelerator sector response stepping relay 192 falls into step with the hoist signal stepping relay 191, the selector circuit will thereupon be disconnected by opening of the rear limit switch 161.

With the rotary magazine ring 44 filled and continuously rotating in a clockwise direction, the accumulator conveyor 45 filled, the decelerator sector 46 in a position toward the left end of slot 101, the mount not moving in train, the selector switch 186 closed to select ammunition and the signal stepping relay 191 one step behind the response stepping relay 192, when the hoist is started, the sun gear 50 is driven intermittently counterclockwise by the gear train 52–60 and advances the accumulator conveyor 45 in steps. Inasmuch as the planet gear 110 is held against clockwise rotation by the action of the Geneva wheel detent 127 in triggering drive gear 107 against clockwise movement, the decelerator sector 46 is effectively connected for intermittent counterclockwise movement with the sun gear 50. When the accumulator conveyor 45 dwells after each counterclockwise movement, the hoist mechanism removes a round of ammunition from the pickup station 48. For each advance of the accumulator conveyor 45, the hoist signal switch 69 is momentarily closed. When the signal stepping relay 191 is one step behind the response stepping relay 192, no electrical connection exists between the relay contacts 193—195 and contact 197, and the selector circuit through switch 186 is thus interrupted whereby operation of the transfer mechanism is prevented. Inasmuch as the transfer mechanism is not operating, the response switch 131 is not being actuated; the response stepping relay 192 is dormant; and the signal stepping relay 191 gains one step for each advance of the accumulator conveyor 45. After the first advance of the conveyor the signal stepping relay falls in step with the response stepping relay thus establishing a connection between contacts 195, 197 completing the selector circuit and starting the transfer of ammunition. With each round transferred the response switch 131 is momentarily opened and the response stepping relay is actuated. This tends to prevent lagging of the response stepping relay behind the hoist signal stepping relay. Though the sun gear 50 is rotating intermittently counterclockwise during hoist operation, thereby tending to advance the decelerator sector, the planet gear 110 during operation of the ammunition transfer mechanism tends to drive the decelerator sector or transfer carriage 46 at a corresponding average speed intermittently clockwise relative to the sun gear. Thus the decelerator sector or transfer carriage 46 tends to remain stationary relative to the mount. When the transfer arm 114 sweeps clockwise over the magazine ring 44, the projectiles thereon are traveling at the speed of the transfer arm jaws 115, 116 so that a round is gripped without appreciable impact. If the hoist is operating when the round is deposited on the accumulator conveyor 45, the conveyor is advancing at transfer arm jaw speed when the transfer arm sweeps over the conveyor whereupon the round is released without appreciable change of speed. If the hoist is not operating and a round is deposited on the dormant conveyor 45, the decelerator sector 46 including the transfer arm 114 is bodily moved clockwise by the planet gear 110 at a speed equal to jaw speed but in an opposite neutralizing direction so that the round is likewise deposited without impact. Should the decelerator sector reach its extreme right position in the marginal slot 101, the hoist motor circuit will thereupon be disconnected by opening of the forward limit switch 158. Were the mount at this point to move in train, the sun gear 50, decelerator sector 46, accumulator conveyor 45 and hoist drive mechanism would move with it; and the annular rings 44, 135 would continue to turn clockwise. The speed of the lower cam ring or carriage 135, however, would be increased or decreased from its normal speed relative to the upper annular platform by an amount equal to the training speed of the mount since the differential gearing 138 is moving at mount speed.

Various changes may be made in the form of invention herein shown and described without departing from the spirit of the invention or the scope of the following claims.

What is claimed is:

1. Equipment for supplying projectiles to a rotary gun mount structure comprising a magazine movable relative to said mount structure, a transfer carriage movable relative to said mount structure and provided with projectile transfer means thereon, and planetary gearing actuable by relative movement of said magazine and carriage to shift said carriage relative to the mount structure and to cause said transfer means to shift a projectile from said magazine to said mount structure.

2. Equipment for supplying projectiles to a rotary gun mount structure comprising an annular magazine rotatable coaxially of the mount structure, a transfer carriage supported for angular movement coaxially of the mount structure and provided with projectile grasping means thereon, and means including planetary gearing actuable by relative movement of said magazine and carriage to move said carriage relative to the mount structure and to cause said grasping means to transfer a projectile from said magazine to said mount structure.

3. Equipment for supplying projectiles to a rotary gun mount structure comprising a rotary magazine for carrying an endless series of projectiles, transfer mechanism actuable to remove a projectile from said magazine, a plurality of cams driven by said rotary magazine for actuating said transfer mechanism, said cams being movable between operative and inoperative positions, and means selectively disposing one of said cams in its operative position whereby a specific projectile carried by said magazine is selected for transfer.

4. Equipment for supplying projectiles to a rotary gun mount structure comprising a ring gear mounted for rotation coaxially of said mount structure, a conveyor supported by said mount structure and driven by said ring gear, drive mechanism on the mount structure for intermittently advancing said ring gear, a rotatable magazine, means continuously rotating said magazine, rotary transfer mechanism mounted for planetary movement relative to said ring gear, said mechanism upon planetary movement in one direction and during a cycle of operation thereof effecting a projectile transfer from the magazine to the conveyor, a detent normally securing said rotary transfer mechanism against planetary movement in said direction, and means intermittently releasing said detent and imparting planetary movement to said transfer mechanism in said direction.

5. Equipment for supplying projectiles to a rotary gun mount structure comprising a rotary magazine for carrying an endless series of projectiles along an annular path, an endless conveyor supported by the mount structure and operating along a continuous path, a rotary transfer arm operating along a circular path joining said magazine and conveyor paths and rotatable in a given direction to effect a projectile transfer therebetween during each revolution of said arm, planetary gearing including a sun gear rotatable coaxially of said magazine and a planet gear, means imparting intermittent unidirectional motion to said sun gear and to said conveyor, and means driven by said rotary magazine intermittently rotating said planet gear and said transfer arm.

6. Equipment for supplying projectiles to a rotary gun mount structure comprising an annular magazine rotatable coaxially of said mount structure for carrying an endless series of projectiles along an annular path, an endless conveyor supported by said mount structure providing a series of projectile accommodating zones along a continuous path, a rotary transfer arm including a releasable projectile-gripping clamp movable along an endless path tangent to said magazine and conveyor paths to effect a projectile transfer therebetween during each revolution of said arm, planetary gearing including a sun gear mounted for rotation coaxially of said magazine and a planet gear meshing with said sun gear, means imparting intermittent unidirectional motion to said sun gear and to said conveyor, motion transmitting means between said planet gear and said transfer arm, and means driven by said rotary magazine intermittently rotating said planet gear.

7. Equipment for supplying projectiles to a rotary gun mount structure comprising a rotary magazine for carrying an endless series of projectiles, a conveyor on the mount structure, a ring gear rotatable coaxially of said mount structure for driving said conveyor, drive means on the mount structure intermittently advancing said ring gear, transfer mechanism oscillatable about the axis of rotation of said mount structure including a rotary transfer arm for effecting projectile transfer between said magazine and said conveyor, a planet gear carried by said oscillatable transfer mechanism and meshing with said ring gear, and means intermittently rotating said planet gear and transfer arm in directions whereby said transfer mechanism is shifted one step retrogressively of said conveyor travel and said transfer arm is rotated throughout a projectile transfer cycle.

8. In off-mount magazine feed equipment for supplying projectiles to a rotary gun mount structure, an annular magazine rotatable coaxially of said mount, means rotating said magazine, transfer mechanism including a rotary projectile carrier for transferring a projectile from said magazine to said mount structure during each cycle of operation thereof, and means actuating said transfer mechanism throughout successive cycles of operation including intermittently driven planetary gearing so interconnecting said mount structure, transfer mechanism and magazine that successive projectiles are transferred firstly from said magazine to said rotary projectile carrier and secondly from said projectile carrier to said mount structure at substantially zero velocity change of the projectiles at the times of said first and second transfer.

9. In equipment for supplying articles to a rotary structure, an annular magazine rotatable coaxially of said rotary structure, means continuously rotating said magazine, an annular cam supporting structure provided with a series of cams and rotatable coaxially of said rotary structure, a transfer carriage supported for angular movement coaxially of said rotary structure and provided with article grasping means thereon, speed reduction gearing pivotally mounted for movement with said carriage and for transmitting rotary motion from said magazine to said cam supporting structure, and means including planetary gearing intermittently actuable by successive cams of said series upon relative movement of said cam supporting structure and said carriage to move said carriage relative to the rotary structure and to cause said grasping means to transfer an article from said magazine to said rotary structure.

10. Equipment for supplying projectiles to a rotary gun mount structure comprising an annular magazine rotatable coaxially of said mount structure for carrying an endless series of projectiles, means continuously rotating said magazine, an annular cam supporting structure provided with a series of cams and rotatable coaxially of said rotary structure, a transfer carriage supported for angular movement coaxially of said rotary structure and provided with a projectile transfer device, speed reduction gearing pivotally mounted for movement with said carriage and for transmitting rotary motion from said magazine to said cam supporting structure, planetary gearing actuable to move said carriage relative to the rotary structure and to cause said grasping means to transfer a projectile from said magazine to said rotary structure, a Geneva wheel pivoted on said transfer carriage for actuating said planetary gearing, said wheel being intermittently advanced by successive cams of said series upon relative movement of said cam-supporting structure and said carriage, and means selectively inoperatively disposing predetermined cams of said series whereby specific projectiles may be selected for transfer.

11. In apparatus of the character described, a rotary structure adapted to turn in either direction about a normally vertical axis, a ring gear mounted for rotation coaxially of said structure, an endless accumulator conveyor mounted on said structure and driven by said ring gear, said conveyor including spaced storage zones movable past a discharge station, intermittent drive mechanism for alternately advancing said ring gear and permit said ring gear to dwell during conveyor discharge times, a rotatable magazine, means continuously rotating said magazine, a decelerator member pivoted for oscillation about said vertical axis, a rotary transfer arm mounted on said decelerator member for effecting a transfer from the magazine to the accumulator conveyor during each revolution thereof, a gear rotatably mounted on said decelerator member in planetary relationship to said ring gear, detent means normally securing said planetary gear against rotation in a direction opposite that of said ring gear the extent of each intermittent movement of said drive mechanism being sufficient to advance said accumulator and decelerator the distance between spaced storage zones of the accumulator conveyor, and means intermittently releasing said detent means and imparting movement to said planetary gear and transfer arm sufficient to effect retrogressive movement of the decelerator a distance corresponding to the distance between spaced storage zones of the accumulator conveyor and to effect a single transfer operation of said arm.

12. In apparatus of the character described, a rotary magazine providing a series of stations along an annular path, an endless conveyor providing a series of stations along a continuous path, a rotary transfer arm including a clamp movable along an endless path tangent to said magazine and conveyor paths to effect a transfer therebetween during each revolution of said arm, planetary gearing including a sun gear mounted for rotation coaxially of said magazine and a planet gear meshing with said sun gear, means imparting intermittent unidirectional motion to said sun gear and to said conveyor, motion transmitting means between said planet gear and said transfer arm, and means driven by said rotary magazine intermittently rotating said planet gear.

13. In apparatus of the character described, a ring gear mounted for rotation about a normally vertical axis, a conveyor driven by said ring gear and including spaced storage zones movable past a discharge station, drive mechanism for intermittently advancing said ring gear between dwell periods permitting conveyor discharge, a rotatable magazine, means continuously rotating said magazine, rotary transfer mechanism mounted for planetary movement relative to said ring gear, said mechanism upon planetary movement in one direction being adapted during a cycle of operation to effect a transfer from the magazine to the conveyor, a detent normally securing said rotary transfer mechanism against planetary movement in said direction, and means intermittently releasing said detent and imparting planetary movement to said transfer mechanism in said direction.

14. In apparatus of the character described, a rotatable carriage movable in either direction about a normally vertical axis, a ring gear mounted for rotation coaxially of said carriage, a conveyor mounted on the carriage and driven by said ring gear, said conveyor including spaced storage zones movable past a discharge station, drive mechanism for intermittently advancing said ring gear between dwell periods permitting conveyor discharge, a rotatable magazine, means continuously rotating said magazine, rotary transfer mechanism mounted for planetary movement relative to said ring gear, said mechanism upon planetary movement in one direction effecting a transfer from the magazine to the conveyor during a cycle of operation thereof, and means imparting planetary movement to said transfer mechanism in said direction.

15. In apparatus of the character described, a rotary magazine providing a series of stations along an annular path, an endless conveyor operating along a continuous path, a rotary transfer arm operating along an endless path joining said magazine and conveyor paths and rotatable in a given direction to effect a transfer therebetween during each revolution of said arm, planetary gearing including a sun gear rotatable coaxially of said magazine and a planet gear, means imparting intermittent unidirectional motion to said sun gear and to said conveyor, and means driven by said rotary magazine intermittently rotating said planet gear and said transfer arm.

16. In the apparatus specific in claim 15, means preventing rotation of said transfer arm in a direction opposite said given direction.

17. In apparatus of the character described, a ring gear mounted for rotation about a normally vertical axis, a conveyor driven by said ring gear and including spaced storage zones movable past a discharge station, drive mechanism for intermittently advancing said ring gear between dwell periods permitting conveyor discharge, a rotatable magazine, means continuously rotating said magazine, rotary transfer mechanism mounted for planetary movement relative to said ring gear, said mechanism upon planetary movement in one direction effecting a transfer from the magazine to the accumulator conveyor during a cycle of operation thereof, and means imparting planetary movement to said transfer mechanism in said direction.

18. In apparatus of the character described, a rotary magazine, a conveyor movable relative to said magazine, a ring gear driving said conveyor, means intermittently advancing said ring gear, transfer mechanism oscillatable about the axis of rotation of said magazine including a rotary transfer arm for effecting transfers between said magazine and said conveyor, a planet gear carried by said oscillatable transfer mechanism and meshing with said ring gear, and means intermittently rotating said planet gear and transfer arm in directions whereby said transfer mechanism is shifted one step retrogressively of said conveyor travel and said transfer arm is rotated throughout a transfer cycle.

19. In apparatus of the character described, a ring gear mounted for rotation about a normally vertical axis, drive mechanism intermittently advancing said ring gear, a conveyor driven by said ring gear, a continuously rotatable magazine, transfer mechanism including a planet gear mounted for rotation and oscillation relative to said ring gear, a detent normally locking said planet gear against rotation in a direction opposite that of said ring gear whereby said ring gear tends to advance said transfer mechanism therewith, Geneva drive mechanism periodically releasing said detent and rotating said planet gear in a direction to move said transfer mechanism retrogressively of said ring gear and to effect a transfer from the magazine to the conveyor, and means discontinuing operation of said Geneva drive mechanism upon disposition of said transfer mechanism in a predetermined retrograde position.

20. In apparatus of the character described, a ring gear mounted for rotation about a normally vertical axis, drive mechanism intermittently advancing said ring gear, a conveyor driven by said ring gear, a continuously rotatable magazine, transfer mechanism including a planet gear mounted for rotation and oscillation relative to said ring gear, a detent normally locking said planet gear against rotation in a direction opposite that of said ring gear whereby said ring gear tends to advance said transfer mechanism therewith, means periodically releasing said detent and rotating said planet gear in a direction to move said transfer mechanism retrogressively of said ring gear and to effect a transfer from the magazine to the conveyor, and means discontinuing operation of said ring gear drive mechanism upon disposition of said transfer mechanism in a predetermined advanced position.

21. In apparatus of the character described, a rotary magazine provided with different sets of storage zones for articles of different kinds, transfer mechanism actuable to remove an article from said magazine, different sets of cams driven by said rotary magazine for selectively actuating said transfer mechanism and thereby effecting the removal of different types of articles, different sets of detents respectively movable with said cam sets and normally holding said cam sets in inactive positions, and trips selectively movable into detent release positions whereby the detents of any one set may be successively released during rotation of said magazine.

22. In apparatus of the character described, a ring gear mounted for rotation about a normally vertical axis, drive mechanism intermittently advancing said ring gear, a continuously rotatable magazine, transfer mechanism including a planet gear mounted for rotation and oscillation relative to said ring gear, a detent normally locking said planet gear against rotation in a direction opposite that of said ring gear whereby said ring gear tends to advance said transfer mechanism therewith, transfer mechanism actuating means periodically releasing said detent and rotating said planet gear in a direction to move said transfer mechanism retrogressively of said ring gear and to effect a transfer from the magazine, a first device advanceable in step with intermittent advancements of said ring gear, a second device advanceable in step with successive retrogressive actions of said transfer mechanism, and means controlling operation of said transfer mechanism actuating means in accordance with the relative positioning of said first and second devices.

23. In apparatus of the character described, a ring gear mounted for rotation about a normally vertical axis, drive mechanism advancing said ring gear in steps, a continuously rotatable magazine, transfer mechanism including a planet gear mounted for rotation and oscillation relative to said ring gear, means normally locking said planet gear against rotation whereby said ring gear serves to advance said planet gear in steps, actuating means rotating and thereby retrogressively moving said planet gear in steps relative to said ring gear, said transfer mechanism removing an article from said rotatable magazine during each of said retrogressive steps, first and second stepping relays, means actuating said first stepping relay once for each advancing step of said ring gear, means actuating said second stepping relay once for each retrogressive step of said planet gear, and means controlling operation of said planet gear actuating means in accordance with the relative positioning of said first and second relays.

24. In equipment for transferring articles between relatively rotatable coaxial supports, a sun gear mounted for rotation coaxially of said supports, means periodically rotating the sun gear relative to one of said supports, a gear carrier mounted for oscillation coaxially of said sun gear, a planet gear rotatably supported by said carrier and meshing with said sun gear, rotary transfer mechanism on said carrier including a releasably gripping article transfer arm, and means periodically actuating said rotary transfer mechanism and said planet gear.

References Cited in the file of this patent

UNITED STATES PATENTS

| | | |
|---|---|---|
| 1,528,893 | Rother | Mar. 10, 1925 |
| 2,456,620 | Chadwick et al. | Dec. 21, 1948 |